May 21, 1963 W. B. BURNET 3,090,606
ROTARY MIXING DEVICE
Filed Sept. 11, 1959 4 Sheets-Sheet 1

INVENTOR.
WILLIAM B. BURNET
BY
Moore, White & Durd
ATTORNEYS

May 21, 1963     W. B. BURNET     3,090,606
ROTARY MIXING DEVICE

Filed Sept. 11, 1959     4 Sheets-Sheet 4

INVENTOR.
WILLIAM B. BURNET
BY
*Moore, White & Burd*
ATTORNEYS

United States Patent Office 3,090,606
Patented May 21, 1963

3,090,606
ROTARY MIXING DEVICE
William B. Burnet, Minneapolis, Minn., assignor to The Strong-Scott Manufacturing Company, Minneapolis, Minn., a corporation of Minnesota
Filed Sept. 11, 1959, Ser. No. 839,536
6 Claims. (Cl. 259—109)

This invention is a device for intimately mixing and dispersing materials together. The chamber in which the mixing is done is of novel clam-shell construction and within which rotates a hollow rotor supporting the mixing paddles. The rotor is supported by external bearings. Novel angled-ended dispersing or kneading paddles are included in the construction and are secured in place by special nut structures which provide unusual support and dampen vibrations. A hollow rotor and drilled passages in its supporting shaft allow a heat transfer medium to be circulated through the rotor to provide temperature control during mixing. The device has been found very successful for mixing intimately small quantities of one material with relatively large quantities of a second material.

Accordingly, it is the principal object of this invention to provide a novel mixing and dispersing machine.

Another object of this invention is to provide such a mixing machine that is readily cleaned and adjusted.

It is still a further object of this invention to provide a mixing and dispersing machine which can be adapted to meet a wide variety of mixing requirements.

Yet another object of this invention is to provide a mixing and dispersing device in which temperature conditions may be controlled during the kneading and mixing operation.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

Figure 1:
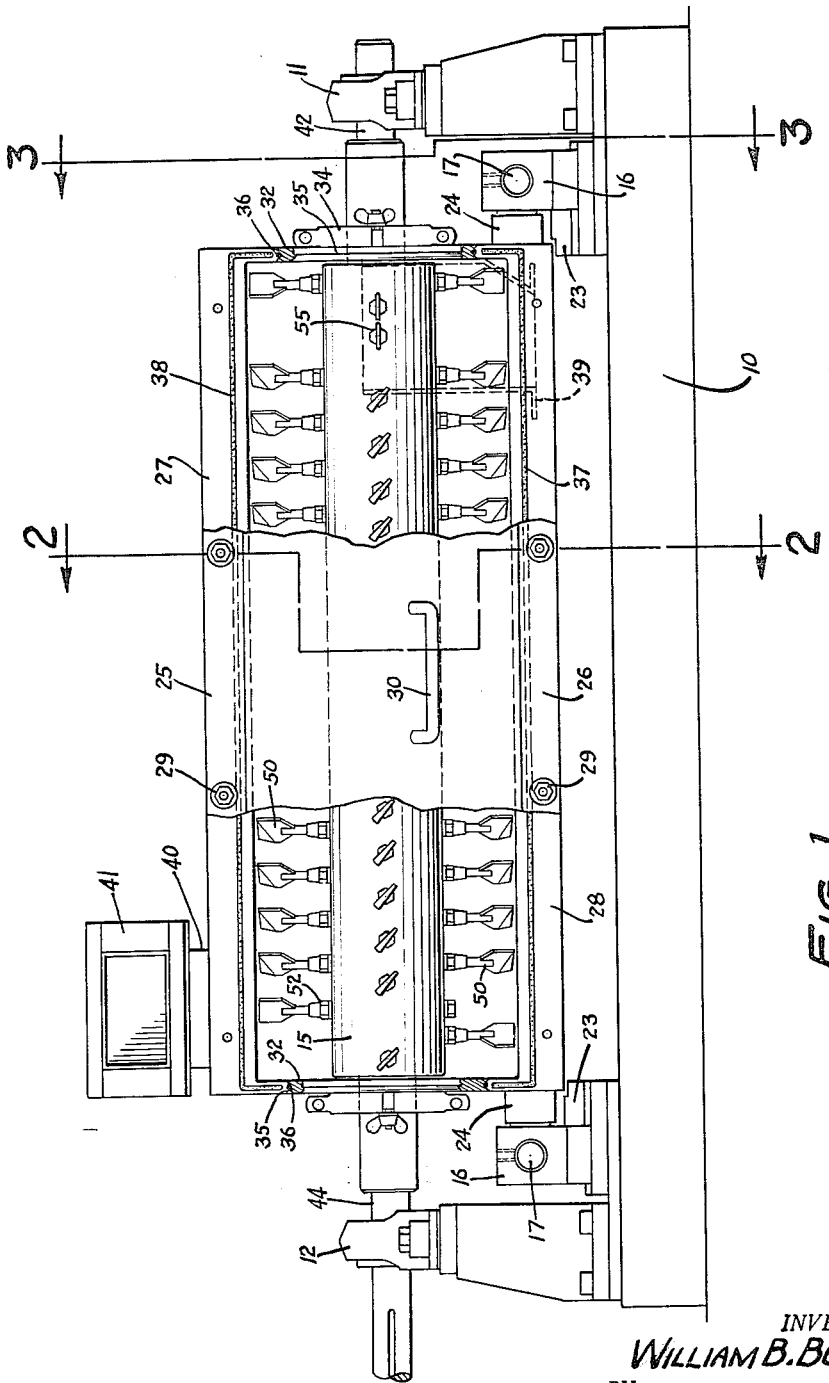
FIGURE 1 is a side elevation of the device with portions of one side broken away to illustrate internal construction; broken lines illustrate hidden parts.

Referring to the drawings, the invention may be seen supported on a base 10 which has at its ends bearing elements 11 and 12 for the right and left hand bearings, respectively. Rotor 15 is appropriately journaled in these bearings. Also secured to the base are the shell shaft supports all of which are designated 16 as they are alike. Rigidly held by shaft supports 16 are the shafts 17. Between the shaft supports 16 at each end of the base 10 is a double-support stopblock structure having formed near its center the stopblocks 18. Between each stopblock 18 and each shaft support 16 extends a portion 19 of shafts 17 which serve as tracks upon which the antifriction bushing members 20 may slide. Antifriction bushing members 20 provide axial movement along the tracks 19. These bushings serve as a pivot as well as sliding support for the shell halves 21 and 22. Stub shafts secured to sleeves 24 secured to the antifriction bushing elements 20 are appropriately journaled in the lower end portions of each shell half.

Shell half 21 has the upper and lower flanges designated 25 and 26, respectively. Similar flanges 27 and 28 are provided for the shell half 22. Any satisfactory means may be used to hold these two flanges in close proximity when the device is in use such as nut-bolt assemblies 29.

When nut-bolt assemblies 29 are released, the two shell halves 21 and 22 may be slid outward from the rotor structure laterally on the axially-moving, low friction bushing units 20 using handles 30 and 31 for the shell halves 21 and 22, respectively. Once the shell halves are moved away from the rotor as far as the shaft supports 16 will permit, the shell halves may be tipped until they engage the mitered ends 23 of the stopblock support plate, as shown in broken lines in FIGURE 3 for easy access to the inside thereof and leaving the rotor element accessible for servicing or adjustment.

Figure 3:
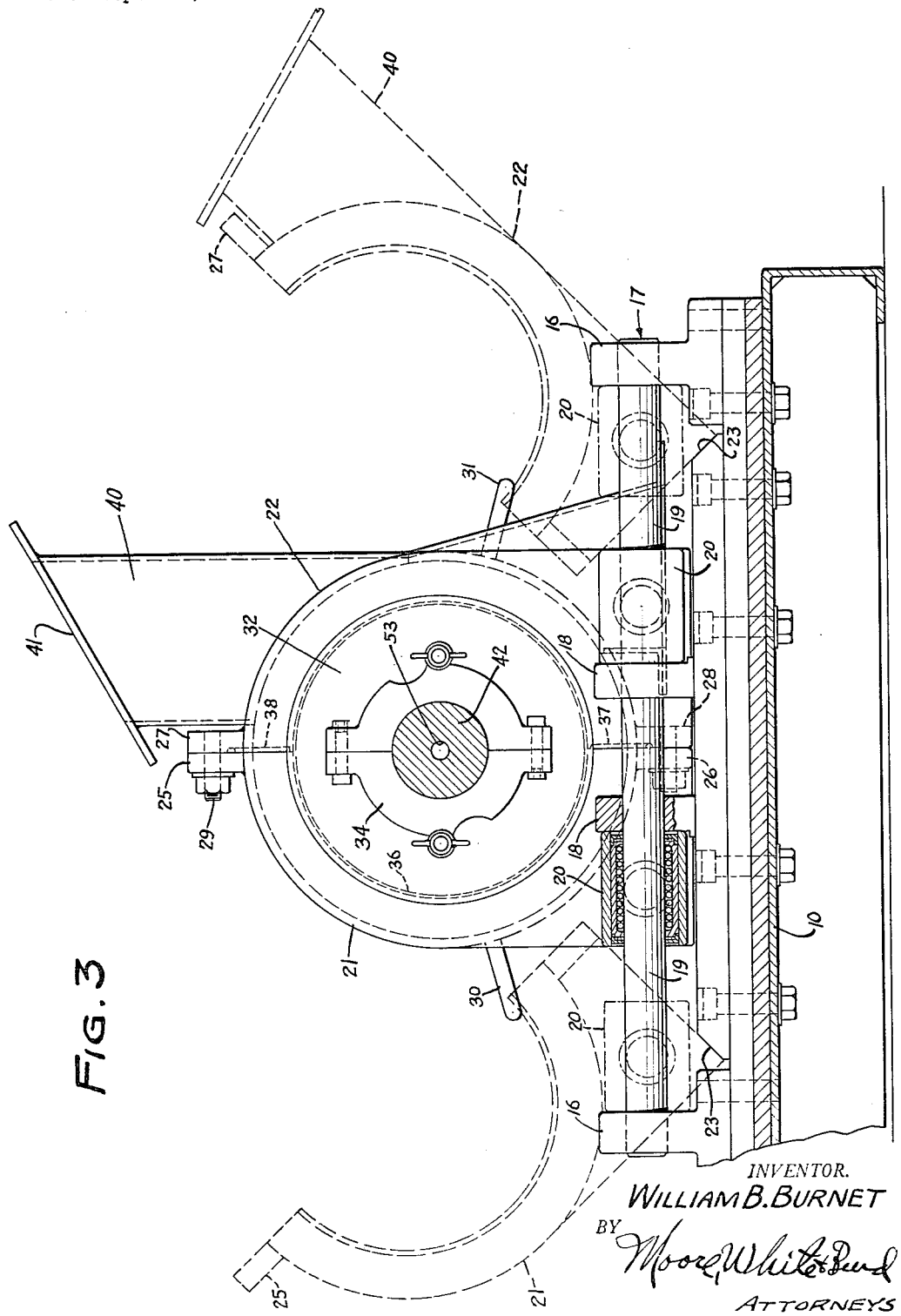
FIGURE 3 is a partial vertical section partial end elevation of the device taken on the line 3—3 of FIGURE 1 and drawn to the same scale as FIGURE 2; broken lines illustrate adjusted positions and hidden parts; a portion of the device is broken away to illustrate internal construction.

As is shown clearly in FIGURE 3, the shells 21 and 22 engage end plates such as the one designated 32 in FIGURES 1 and 3 rather than extending clear down to the shaft. This permits the end plate structure 32 to support a suitable shaft seal 34, the details of which are not material to this invention. A material-tight connection is made between end plate 32 and the shell halves by means of an annular V groove designated 35 in the end plates within which an O-ring 36 is placed. The O-ring is engaged by the end portions of the shell 21 and 22 as may be seen in FIGURE 1 to form a seal between the shell and end plates.

Seals 37 and 38 for the lower and upper edges of the shells, respectively, extend from the side plate in milled grooves along flanges 27 and 28 of the shell portion 22 to seal the two flanges together when the machine is closed for operation. Placing seal 37 and 38 in grooves permits direct contact of flanges 25 and 26 with flanges 27 and 28 when the shell is closed. Shell 22 carries also the tangential outlet 39 and inlet 40 which are at opposite ends of the shell structure. Tangential inlet 40 has a sloping flange 41 at the top thereof to permit forming a separable connection to a feed hopper or chute which is not a part of this invention and not illustrated.

Figure 4:
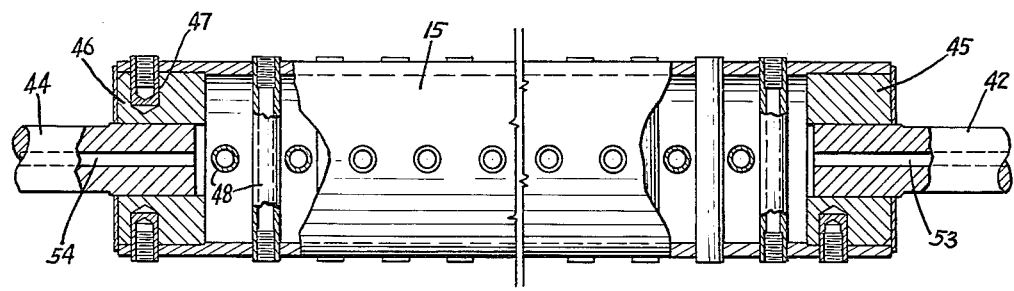
FIGURE 4 is a partial side elevation, partial vertical section of the rotor with portions of it deleted to conserve space; hidden portions are illustrated with broken lines; it is drawn to the same scale as FIGURE 2.

Referring now to FIGURE 4, the rotor 15 will be seen to consist of a hollow cylindrical member to which stub shafts 42 and 44 are appropriately anchored by means of end plugs 45 and 46. Plugs 45 and 46 are shrink fitted into the end of the cylinder with elements 47 further securing them against relative rotation. Shafts 42 and 44 are rigidly secured to end plugs 45 and 46. Extending from one side of the rotor to the other between the end plugs are the tubular nuts designated 48. Tubular nuts 48 are internally threaded to receive the paddles.

Kneading paddles designated 50 are particularly valuable in rolling or kneading the material passing through the device while the rotor paddles designated 49 are pitched to advance material through the unit. Kneading paddle 50 has one top corner bent down at an angle relative to its axis which provides the desired kneading action portion 51.

Figure 2:
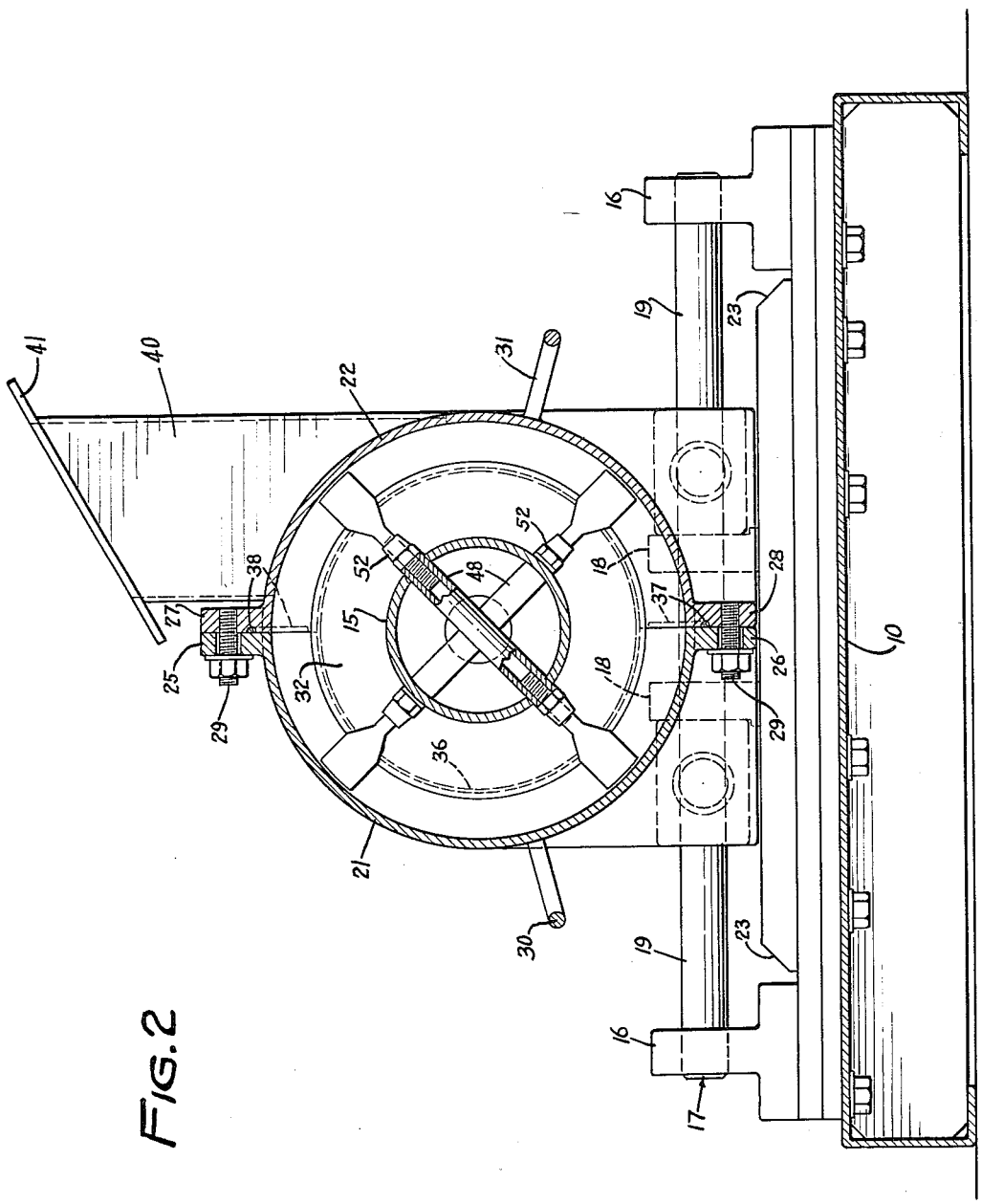
FIGURE 2 is a vertical section of the device taken on the line 2—2 of FIGURE 1 and drawn to a larger scale; broken lines illustrate hidden parts.

Paddles 49 and 50 threadably engage tubular nuts 48 and are secured in a selected position thereon by means of a special jam nut designated 52. As may be seen in FIGURES 1 and 2, these jam nuts have long shoulders that engage the ends of tubular nuts 48 as well as the shank of the paddles. This method of securing the paddles to the rotor both distributes stresses well and also tends to dampen vibrations. The result is a very strong, low vibration rotor unit for high speed mixing operations.

As seen clearly in FIGURE 4, stub shaft 42 is provided with a passageway 53 while the stub shaft 44 has a similar drilled passageway 54. Cylinder 15 is hollow and the two stub shafts being drilled provide inlet and outlet for a heat transfer medium to aid in controlling the temperature of the mass being worked in the mixer. The ends of the stub shafts are provided with conventional rotating connection joints for ease of coupling conduits carrying a heat transfer medium to each end of the rotor assembly.

The kneading paddles 50 may be angularly disposed on the rotor with the slanting portion 51 pointing back away from the direction of rotation or leaning into the direction of rotation, depending on the type of action desired. Likewise the pitch or angle of the flat portion of the blade below the bent tip will determine to some extent the rate at which the materials are forced through the mixing device.

Figures 5, 6:
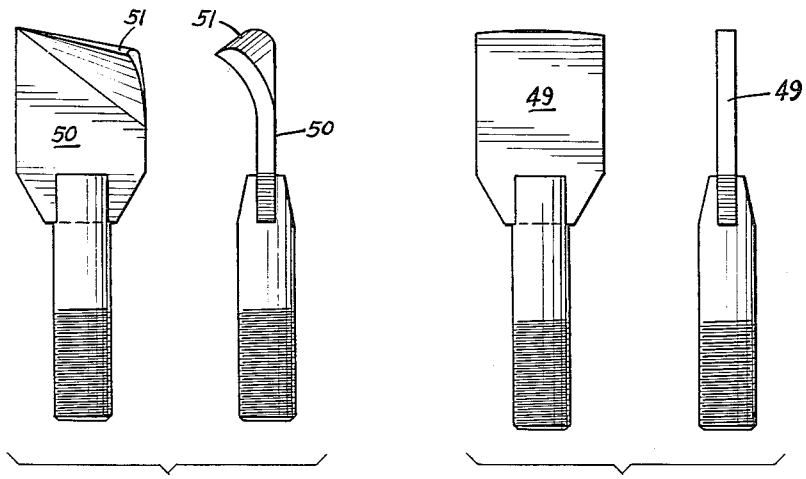
FIGURE 5 is both side and front elevation of a special kneading paddle; it is drawn to a scale larger than that used in FIGURE 2.
FIGURE 6 is both a front and side elevation of one of the impeller paddles drawn to the same scale as FIGURE 5.

In FIGURE 1 in areas where the principal object is to move materials rather than to knead them rotor paddles are used. The straight paddles 50 are so positioned as to cause materials to move in the desired direction. Opposite the intake, the plain paddles are tipped in such a manner as to cause the material to be advanced immediately into the kneading section of the mixer. Opposite the discharge end it will be noted that a pair of the regular paddles designated 55, in order to point them out clearly, are arranged with their paddle blades parallel to the axis of rotation of the rotor so as to throw material centrifugally out through the tangential outlet 39. At the extreme discharge end of the device will be seen two of the rotor paddles, like the one illustrated in FIGURE 6, which convey material from the right to left as viewed in FIGURE 1. These paddles throw material that passes exit 39 back into the path of paddles 55 to prevent material from piling up at the exit end of the device. The machine is readily opened in order to permit adjustment of the paddles to effect the particular action intended.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A mixing device comprising, a frame, bearings secured to said frame, a mixing rotor journaled in said bearings, track means secured to said frame and extending transversely of said mixing rotor, track followers secured to said track for axial movement relative thereto, stops on said tracks near said rotor, shell halves pivoted to said track followers, flanges on the edges of said shell halves, and means for sealing said shell halves around said mixing rotor when said track followers are engaging said stops.

2. The mixing device of claim 1 in which said sealing means includes, end plates embracing rotatably the shaft of said mixing rotor, said end plates having annular grooves therein, resilient sealing rings in the annular grooves of said end plates, said shell halves having end plate groove engaging portions.

3. The mixing device of claim 1 in which said track means are shafts, and said track followers are antifriction bushings.

4. A high speed rotary mixing device comprising, a frame, bearings secured to a fixed location to said frame, a hollow mixing rotor, axially-bored stub shafts supporting said hollow mixing rotor and journaled in said bearings, tracks secured to said frame and extending transversely of said mixing rotor, stop means at both the center and outside ends of said tracks, track followers secured to said tracks for axial movement on said track between each inside and outside stop means, shell halves pivoted to said track followers, circular, annularly-grooved end plates secured to said rotor in alignment with the ends of said shell halves, and a resilient seal in the annular groove of each of said end plates, flanges on said shell halves adapted to abut each other when said track followers are engaged with the inside stops on said tracks, resilient seals extending along said flanges, said shell halves having cutout end portions that cooperate with said end plates and fit in the annular groove thereof to engage said resilient seal, means for securing said flanges together when said shell halves are embracing said end plates.

5. A mixing device comprising: a frame, bearings rigidly mounted on said frame, a shaft journalled in said bearings, paddles extending radially from said shaft, means securing said paddles to said shaft, guides secured to said frame, shell halves mounted on said guides, each half being slidable on said guides for movement to and from said bearings and shaft, said shell halves having cooperating facing edge structure for sealing said shell halves around said shaft and paddles to form an openable mixing chamber, and means for rotating said shaft and paddles.

6. The mixing device of claim 5 in which said paddles have shanks and broad ends, said means securing said paddles to said shaft comprising threads on said paddle shanks and in said shaft, and nuts of greater axial extension than diameter engaging said threads on said shanks of said paddles and the surface of said shaft to fix releasably said paddles relative to said shaft.

References Cited in the file of this patent

UNITED STATES PATENTS

| 256,310 | Fowler | Apr. 11, 1882 |
| 1,224,798 | Saxe | May 1, 1917 |
| 1,740,657 | Komarek | Dec. 24, 1929 |
| 1,909,324 | Wendler | May 16, 1933 |
| 1,948,871 | Quehl | Feb. 27, 1934 |
| 2,092,992 | Thalman | Sept. 14, 1937 |
| 2,450,492 | Stevenson | Oct. 5, 1948 |
| 2,530,858 | Cerniak | Nov. 21, 1950 |
| 2,554,071 | Strawn | May 22, 1951 |
| 2,727,732 | Plumb et al. | Dec. 20, 1955 |
| 2,844,362 | Lombi | July 22, 1958 |

FOREIGN PATENTS

| 1,137,434 | France | Jan. 14, 1957 |
| 137,901 | Great Britain | Jan. 29, 1920 |